United States Patent
Bigand

(10) Patent No.: US 9,804,187 B2
(45) Date of Patent: Oct. 31, 2017

(54) AERODYNAMIC MEASUREMENT PROBE WITH EVACUATION OF PENETRATED LIQUID BY GRAVITY

(71) Applicant: THALES, Neuilly sur Seine (FR)

(72) Inventor: Jean-Louis Bigand, Vendome (FR)

(73) Assignee: THALES, Courbevoie (FR)

(*) Notice: Subject to any disclaimer, the term of this patent is extended or adjusted under 35 U.S.C. 154(b) by 0 days.

(21) Appl. No.: 14/489,957

(22) Filed: Sep. 18, 2014

(65) Prior Publication Data
US 2015/0082878 A1    Mar. 26, 2015

(30) Foreign Application Priority Data

Sep. 20, 2013  (FR) ..................... 13 02188

(51) Int. Cl.
*G01C 21/00* (2006.01)
*G01P 13/02* (2006.01)

(52) U.S. Cl.
CPC ....... *G01P 13/025* (2013.01); *Y10T 29/49826* (2015.01)

(58) Field of Classification Search
CPC ... B64D 43/02; B64D 2700/6228; G01P 5/16; G01P 13/025; G01P 5/165; G01P 5/10; G01P 5/14; G01P 13/0006; G01M 9/06; G05B 9/02; G01L 27/007; G01C 23/005
USPC ........ 73/180, 182, 188–189, 861.68, 170.14, 73/170.09
See application file for complete search history.

(56) References Cited

U.S. PATENT DOCUMENTS

| | | | |
|---|---|---|---|
| 3,514,997 A | 6/1970 | Gwathmey et al. | |
| 3,534,600 A | 10/1970 | Eichweber et al. | |
| 5,544,526 A * | 8/1996 | Baltins | G01P 13/025 73/180 |
| 6,012,331 A * | 1/2000 | Menzies | G01C 23/005 73/180 |
| 2004/0188945 A1 | 9/2004 | Poincet et al. | |
| 2004/0261518 A1* | 12/2004 | Seidel | B64D 43/02 73/182 |

FOREIGN PATENT DOCUMENTS

| | | |
|---|---|---|
| FR | 1600479 A | 7/1970 |
| FR | 2829824 A1 | 3/2003 |

* cited by examiner

*Primary Examiner* — Harshad R Patel
*Assistant Examiner* — Brandi Hopkins
(74) *Attorney, Agent, or Firm* — Baker & Hostetler LLP

(57) ABSTRACT

An aerodynamic measurement probe intended to measure a local angle of attack of an airstream flowing along the fuselage of an aircraft, comprises a support and a shaft that is able to rotate about a longitudinal axis with respect to the support. The support and the shaft are configured to form between one another a plurality of successive chicanes about the longitudinal axis. Each chicane makes it possible to transport liquid that has penetrated into the chicane: along a first path, under the effect of gravity, towards an evacuation circuit associated with the chicane and formed in the support, and along a second path, and counter to the effect of gravity, towards a successive chicane or towards the shaft. The evacuation circuit of each of the chicanes makes it possible to evacuate liquid out of the support under the effect of gravity moving away from the shaft.

14 Claims, 4 Drawing Sheets

AERODYNAMIC MEASUREMENT PROBE WITH EVACUATION OF PENETRATED LIQUID BY GRAVITY

CROSS-REFERENCE TO RELATED APPLICATION

This application claims priority to foreign French patent application No. FR 1302188, filed on Sep. 20, 2013, the disclosure of which is incorporated by reference in its entirety.

FIELD OF THE INVENTION

The present invention relates to the field of aerodynamic measurement probes and notably angle-of-attack probes and sideslip probes. More precisely, it relates to an aerodynamic measurement probe comprising a device for evacuating penetrated liquid by gravity.

BACKGROUND

According to one known technique, aerodynamic measurement probes comprise a part that is able to rotate and is intended to orient itself in line with the airstream surrounding the aircraft on which the support is mounted. The measurement of the local angle of attack of an airstream against the fuselage of an aircraft is an essential parameter for piloting the latter. It makes it possible to define the direction of the velocity vector of the aircraft with respect to the ambient air surrounding it.

The use of a moving vane poses the problem of the sealing of the vane with respect to its support embedded in the fuselage of the aircraft. It is necessary to provide means to prevent or limit the penetration of liquid into the mechanism of the probe. Various solutions comprising sealed rolling bearings, involving dry friction or viscous friction, have been envisaged to resolve this difficulty. These solutions have variable performance levels in terms of sealing and can be dimensioned in accordance with the requirements of the aircraft. However, dry or viscous friction between the pin and the support generates a torque which resists the rotation of the vane. In order to meet the highest demands in terms of the precision and response time of aerodynamic probes, it has been envisaged to employ pins that rotate in a frictionless manner with respect to the support. In order to allow free rotation of the pin, the rotating pin is connected to the support by a set of bearings for guiding in rotation, without seals or other sealing means in contact with the pin. It is thus conceded that liquid can penetrate at the interface between the pin and the support, through the functional clearance necessary for rotation. Thus, a breathable device is referred to, able to accept by design a certain quantity of penetrated liquid or the presence of moisture.

For these devices having a pin that rotates in a frictionless manner, there is nevertheless a desire to limit the quantity of penetrating liquid. An excessive quantity of liquid stagnating in the mechanism is likely to generate premature wear to the mechanism by corrosion. One known solution is to employ mechanical protectors for preventing direct penetration of liquid along the pin.

Figure 1A:
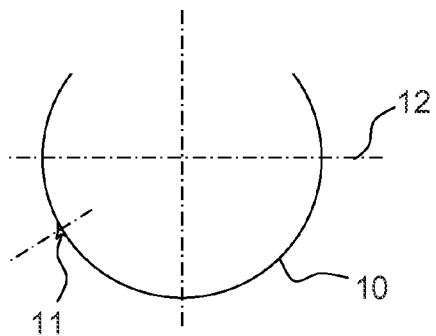

An aerodynamic probe can be mounted at various locations on the fuselage of the aircraft. In order to measure the sideslip of the aircraft, it is necessary to position the probe near to the vertical axis of the aircraft. In order to measure the angle of attack, it is necessary to position the probe near to the horizontal axis. FIG. 1a describes the fitting of a probe 11 on the fuselage 10 of an aircraft shown in cross section. In this example, the probe is fastened to the lower hemisphere of the fuselage, or in other words below the horizontal axis 12, near to this axis. As shown in a cross-sectional view in FIG. 1b, the probe 11 comprises a shaft 20 that is able to rotate in a support 21 about a longitudinal axis with the reference X, and by means of a set of bearings 22. The shaft 20 comprises a disc 23 separating an outer part 20a of the shaft, located outside the fuselage, from an inner part 20b of the shaft, located inside the fuselage. The support 21 comprises a cover 25 provided with a circular opening 26 through which the shaft 20 passes. The disc 23 and the cover 25, disposed opposite one another in the region of the circular opening 26, limit the penetration of liquid from the outside of the aircraft towards the inner part of the probe. For a probe mounted under the fuselage of the aircraft, as shown in FIG. 1a, liquid that has penetrated can be evacuated through the circular opening under the effect of gravity.

In the case of a spray of liquid directed directly towards the shaft, significant quantities of liquid may penetrate, along the penetration path 28 shown by way of solid lines. For example, the aeronautical standard DO160, which specifies harsh conditions of a spray of pressurized liquid directly onto the pin of the probe, is known. Typically, the probe is exposed to a pressurized jet of 60 000 Pa generated by an outlet nozzle with a diameter of 6.35 mm. In order to meet the most recent requirements of aeronautics, it is thus desirable to improve the efficiency of the evacuation of penetrated liquid by gravity from the probes having a pin that rotates in a frictionless manner.

SUMMARY OF THE INVENTION

One aim of the invention is notably to remedy all or some of the above mentioned drawbacks. To this end, the subject of the invention is an aerodynamic measurement probe intended to measure a local angle of attack of an airstream flowing along the fuselage of an aircraft, comprising a support and a shaft that is able to rotate about a longitudinal axis with respect to the support. The support and the shaft are configured to form between one another a plurality of successive chicanes about the longitudinal axis. Each chicane makes it possible to transport liquid that has penetrated into the chicane:
  along a first path, under the effect of gravity, towards an evacuation circuit associated with the chicane and formed in the support, and
  along a second path, and counter to the effect of gravity, towards a successive chicane or towards the shaft.

The evacuation circuit of each of the chicanes makes it possible to evacuate liquid out of the support under the effect of gravity moving away from the shaft.

Advantageously, the support comprises a capturing chamber, associated with a chicane, towards which liquid that has penetrated into the chicane is driven under the effect of gravity; the evacuation circuit associated with the chicane communicating with at least one low point of the capturing chamber.

Advantageously, the capturing chamber associated with a chicane consists of a circular groove open towards the chicane and communicates with the evacuation circuit associated with the chicane at a low point of the capturing chamber.

Advantageously, the capturing chamber associated with a chicane consists of a groove open towards the chicane along a portion of an arc of a circle; each end of the portion of an arc of a circle forming a low point of the capturing chamber and communicating with the evacuation circuit associated with the chicane.

Advantageously, the evacuation circuit associated with a chicane comprises at least one expansion cavity that is connected to the chicane by an evacuation duct and comprises one or more outlet orifices that are able to transport, under the effect of gravity, liquid that has accumulated in the expansion cavity towards an expansion cavity associated with a preceding chicane or out of the support.

In one embodiment of the invention, the probe comprises at least two successive chicanes:
- a first chicane with which a circular capturing chamber open towards the first chicane, and an evacuation circuit comprising an expansion cavity connected to the circular capturing chamber by a radial evacuation duct are associated,
- and at least one second successive chicane with which a capturing chamber open towards the second chicane along a portion of an arc of a circle, and an evacuation circuit comprising two expansion cavities each connected to one end of the portion of an arc of the circle by a radial evacuation duct are associated; the expansion cavity associated with the first chicane comprising a plurality of outlet orifices that are able to transport accumulated liquid out of the support; the expansion cavities associated with the at least one second chicane each comprising an outlet orifice that is able to transport accumulated liquid towards the expansion cavity associated with the first chicane.

In one particular embodiment of the invention, the probe comprises three successive chicanes: one first chicane and two second chicanes that each have the above-described characteristics.

Advantageously, the expansion cavity and the outlet orifices associated with the first chicane are configured such that liquid that has penetrated through a first outlet orifice is evacuated preferably through a second outlet orifice, limiting returns of liquid towards the chicane.

Advantageously, the probe comprises at least one chicane in which the smallest dimension of the minimum flow cross section of the first path is larger than the smallest dimension of the minimum flow cross section of the second path.

Advantageously, the probe comprises at least one chicane in which the smallest dimension of the minimum flow cross section of the first path is large enough to allow the transport of water droplets.

Advantageously, the probe comprises at least one chicane in which the smallest dimension of the minimum flow cross section of the first path is larger than 3 mm.

Advantageously, the probe comprises at least one chicane in which the smallest dimension of the minimum flow cross section of the second path is small enough to prevent the transport of water droplets and to limit the passage of pressurized liquid.

Advantageously, the probe comprises at least one chicane in which the smallest dimension of the minimum flow cross section of the second path is smaller than 3 mm.

Finally, the invention also relates to a method for manufacturing a probe as described above, further comprising a step of simultaneous additive manufacturing of a part of the support and of a part of the shaft that together form the successive chicanes.

BRIEF DESCRIPTION OF THE ACCOMPANYING DRAWINGS

The invention will be better understood and further advantages will become apparent from reading the detailed description of an embodiment given by way of example in the following figures.

Figure 1B:
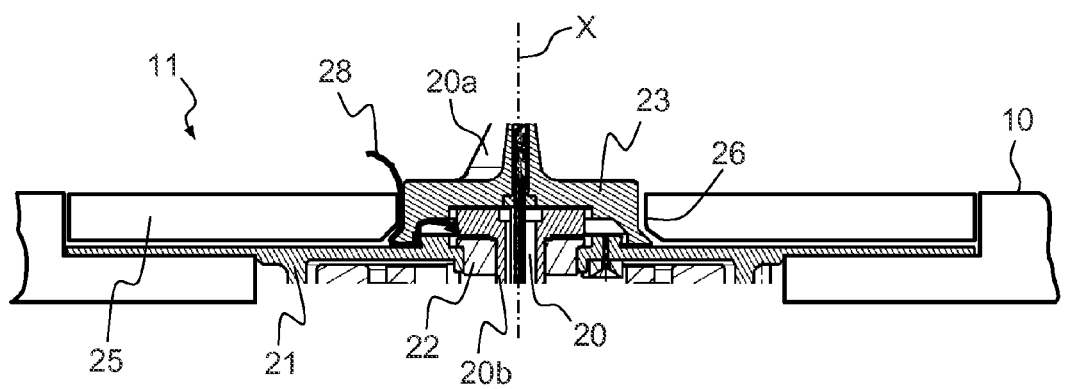
Figure 2A:
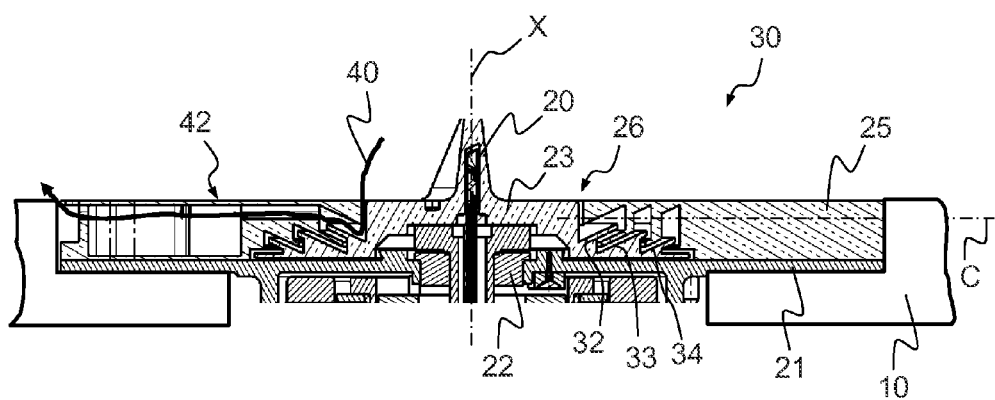
Figure 2B:
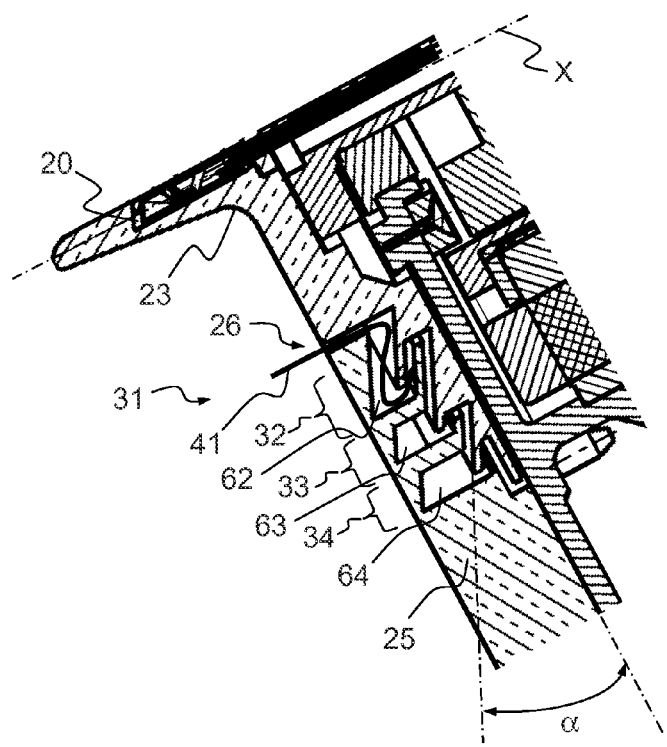
Figure 3:
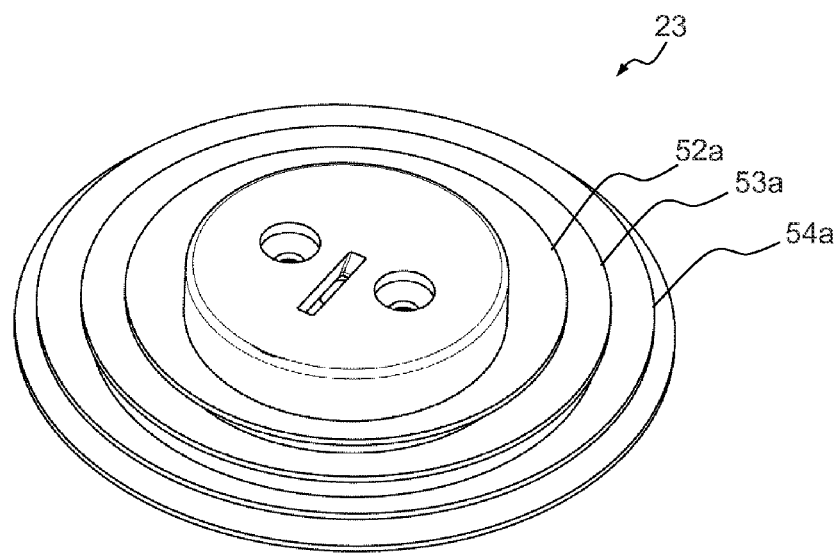
Figure 4A:
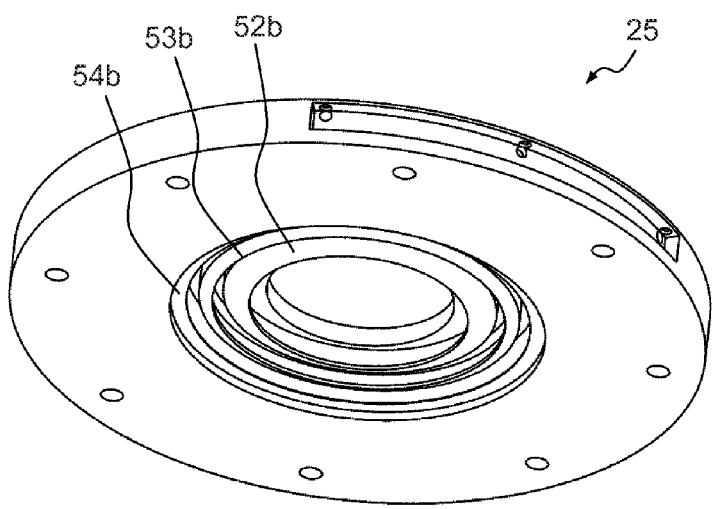
Figure 4B:
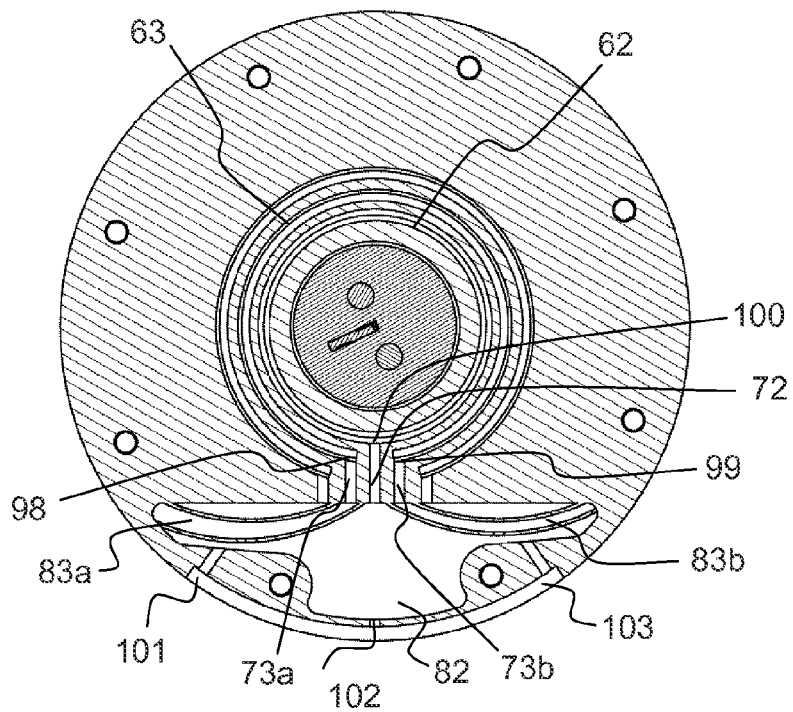
Figure 4C:
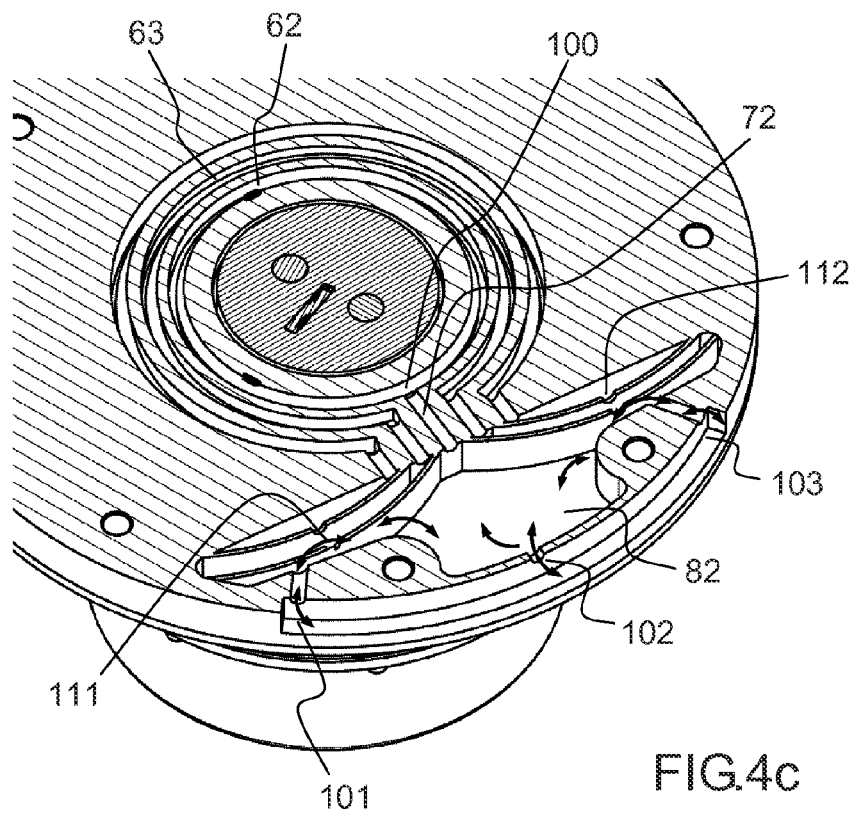

FIGS. 1a and 1b, already presented, illustrate the principle of a probe having a pin that rotates in a frictionless manner with evacuation of penetrated liquid by gravity, said probe being evaluated internally by the applicant, FIGS. 2a and 2b show two cross-sectional views of an aerodynamic measurement probe according to an embodiment of the invention, FIG. 3 shows a perspective view of a moving shaft of an aerodynamic measurement probe according to the embodiment of the invention, FIGS. 4a, 4b and 4c show a number of cross-sectional and perspective views of a cover of an aerodynamic measurement probe according to the embodiment of the invention.

For the sake of clarity, the same elements bear the same reference signs in the various figures.

DETAILED DESCRIPTION

FIGS. 2a and 2b show an aerodynamic measurement probe according to a preferred embodiment of the invention. The probe 30 comprises a plurality of elements in common with the above-described probe 11, which are not systematically described again in detail. The probe 30 comprises in particular a shaft 20 that is able to rotate about a longitudinal axis with the reference X in a support 21 fastened to the fuselage of the aircraft, and by means of a set of bearings 22. The shaft 20 comprises a disc 23 disposed opposite a circular opening 26 in the cover 25 secured to the support 21.

In the embodiment shown in FIGS. 2a and 2b, the probe is intended to be mounted on the fuselage of an aircraft in a manner of fitting similar to that described above in FIG. 1a. The probe 30 is thus shown in FIG. 2b in its target orientation. The axis X forms an angle of around 25° with the horizontal axis. This manner of fitting corresponds to a preferred application of a probe according to the invention. The components shown in FIGS. 2a, 2b, 3, 4a, 4b and 4c that will now be described are adapted to this manner of fitting in terms of their shape. It is clear that the present invention is not limited to this particular manner of fitting but more generally covers any aerodynamic measurement probe that is intended to measure a local angle of attack of an airstream against the fuselage of an aircraft, regardless of its manner of fitting to the fuselage, either above or below the horizontal axis. On the basis of the embodiment given here by way of example, a person skilled in the art will easily understand the shape adaptations that allow optimal operation of a probe according to the invention that is suitable for a different manner of fitting to the fuselage of the aircraft.

The penetrated-liquid evacuation device 31 of the probe 30 comprises the cover 25 of the support 21 and the disc 23 of the shaft 20. The cover 25 and the disc 23 facing one another in the region of the opening 26 in the cover are configured to form a plurality of successive chicanes about the longitudinal axis. Since the cover is secured to the support and the disc is secured to the shaft, the invention relates in a general manner to a probe in which the shaft and the support are configured to form between one another a plurality of chicanes about the longitudinal axis. In the embodiment shown, the device 31 comprises three chicanes 32, 33 and 34. Each of the chicanes is formed by grooves in the cover that cooperate with grooves in the disc. The successive chicanes are configured to oppose the penetration of liquid through the opening 26.

For this purpose, the shape of each chicane is configured so as to allow liquid to flow through the chicane along two paths. FIG. 2a shows a first path 40 by which liquid that has penetrated through the opening 26 can flow through the first chicane 32 towards an evacuation circuit 42 formed in the cover 25. FIG. 2b shows a second path 41 by which liquid that has penetrated can flow through the first chicane 32 towards the second chicane 33. Advantageously, the first path 40 is strongly favoured by the effect of gravity. In contrast, the second path 41, which has a portion in which the liquid must rise, counter to the effect of gravity, is disfavoured.

This effect is further reinforced by the dimensioning of each of the paths. Advantageously, the minimum flow cross section of the first path is larger than the minimum flow cross section of the second path. More specifically, it is advantageous to configure on the one hand a minimum flow cross section of the first path in which the smallest dimension is large enough to allow the transport of water droplets, and on the other hand a minimum flow cross section of the second path in which the smallest dimension is small enough to prevent the transport of water droplets, liquid then penetrating by capillary action or under the effect of residual jet pressure. It is known that the minimum diameter of a water droplet is less than 3 mm. Thus, flow cross sections in which the smallest dimension is larger than 3 mm for the first path and smaller than 3 mm for the second path will preferably be defined. As a result of the dimensioning of the two paths, with a first path that allows the transport of water droplets and a second path that only allows the transport of liquid by capillary action or under the effect of the residual pressure of the penetrating jet, the evacuation of liquid that has penetrated by the first path is favoured. This dimensioning reinforces the effect of gravity which also favours the first path.

Thus, in the case of penetration of liquid through the opening 26, most of the liquid is evacuated by the first path, a smaller part is transported by the second path towards a successive chicane. The device according to the invention comprises a plurality of successive chicanes about the longitudinal axis. Each chicane acts in the manner of a barrier to penetrations that may have been able to clear the preceding barrier. The series of communicating chicanes configured in this way makes it possible to evacuate the majority of the liquid through the evacuation circuits, away from the pin and out of the pressurized jet.

FIG. 3 shows a perspective view of the disc 23. The visible face is the upper face, on which there are formed three sets of circular grooves 52a, 53a and 54a which, cooperating with grooves formed on the cover, form the three above-described chicanes 32, 33 and 34.

FIGS. 4a, 4b and 4c show a number of cross-sectional and perspective views of the cover 25. FIG. 4a shows a perspective view of the cover 25. The visible face is the lower face, in contact with the support 21. The cover 25 comprises three sets of circular grooves 52b, 53b and 54b which, cooperating with the grooves 52a, 53a and 54a formed on the disc 23, form the three chicanes 32, 33 and 34.

FIGS. 4b and 4c show cross-sectional views of the cover 25. The section plane of this view is shown in FIG. 2a by the axis line with the reference C. Associated with the first chicane 32 are a capturing chamber 62 and an evacuation circuit comprising an evacuation duct 72 and an expansion cavity 82. The capturing chamber 62 consists of a circular groove formed in the cover 25 and is open towards the chicane 32. The evacuation duct 72 formed in the cover 25 connects the low point 100 of the capturing chamber 62 and the expansion cavity 82 along a radius of the cover. Its manner of fitting corresponds to the radius of maximum slope. The expansion cavity 82 formed in the cover 25 comprises three outlet orifices 101, 102 and 103.

By the effect of gravity, liquid that has penetrated into the first chicane is driven by gravity towards the capturing chamber, preventing the formation of stagnating liquid in the chicane. The liquid then reaches the low point of the capturing chamber which communicates with the evacuation duct. The liquid is then conducted through the expansion cavity and is then evacuated out of the support through the outlet orifices. This route corresponds to the first possible path for the liquid that has penetrated into the chicane.

According to the same principle, a capturing chamber and an evacuation circuit for evacuating liquid out of the support by the effect of gravity moving away from the shaft are associated with the two following chicanes. The geometry of the capturing chambers and of the evacuation circuits of the two chicanes 33 and 34 differs from that of the first chicane 32. Thus, the capturing chamber 63 associated with the chicane 33 consists of a groove that is open towards the chicane along a portion of an arc of a circle. The two ends 98 and 99 of the arc of a circle form two low points of the capturing chamber. The evacuation circuit then comprises two expansion cavities 83a and 83b that are connected to the two low points of the capturing chamber by two evacuation ducts 73a and 73b. The evacuation ducts 73a and 73b can extend along a radius of the cover or parallel to the duct 72. Each expansion cavity 83a and 83b comprises an outlet orifice 111 and 112 that is disposed at a low point of the expansion cavity and communicates with the expansion cavity 82 of the first chicane.

When liquid clears the first chicane by the second path, it is driven by the effect of gravity towards the capturing chamber of the second chicane. The liquid then reaches one of the low points of the chamber and the evacuation circuit conducts it out of the support, through one of the ducts and one of the expansion cavities.

The capturing chamber and the evacuation circuit associated with the third chicane are identical to those of the second chicane and are thus not described in detail. The embodiment shown comprises three chicanes, but the invention more broadly covers a probe comprising at least two successive chicanes. The embodiments of the capturing chambers and of the evacuation circuits that have been described can be associated with each of the chicanes or with some of them. Advantageously, the probe associates with each chicane a dedicated evacuation circuit which does not communicate, near to the pin, with the evacuation circuit of the adjacent chicane. The expansion cavities communicate with one another through the outlet orifices, but this communication is away from the pin. The evacuation paths for liquid are independent so as to avoid communication between the paths and returns of liquid towards the preceding or following path by a shorter path that has fewer obstacles to the pressurized liquid.

The device according to the invention is advantageously configured to prevent returns of liquid towards the chicanes in the case where the outlet is exposed to the jet of pressurized liquid. The expansion cavity 82 associated with the first chicane comprises a plurality of outlet orifices that are at a distance from one another. This distance is large enough that, in the case where the jet passes directly into a first orifice, the liquid which passes into the expansion cavity is evacuated through a second orifice without accumulating in the expansion cavity. This route is shown by the arrows in FIG. 4c.

The embodiment shown in the figures is suitable for a probe mounted under the fuselage of the aircraft such that its longitudinal axis makes an angle of around 30° with the horizontal. In order to favour the transport by gravity along the first path, the chicanes are thus also inclined at an angle equal to or less than 30° with the plane of the support, as shown by the angle α in FIG. 2b. If a different manner of fitting the probe is desired, the orientation of the chicanes is adapted depending on the orientation of the probe mounted on the aircraft. On account of the orientation of the chicanes, the cover 25 and the disc 23 form a non-separable interleaved assembly. A plurality of methods are envisaged for manufacturing this assembly. Advantageously, an additive manufacturing method will be employed, for example using laser sintering, allowing the simultaneous manufacture of a portion of the support, the cover 25, and of the portion of the shaft, the disc 23. Simultaneous additive manufacturing makes it possible to obtain in one step the two interleaved components that form the successive chicanes. In a subsequent step, the cover and support assembly may be mounted on the support and on the shaft.

The invention claimed is:

1. An aerodynamic measurement probe intended to measure a local angle of attack of an airstream flowing along the fuselage of an aircraft, the measurement probe comprising:
   a support and a shaft that is able to rotate about a longitudinal axis with respect to the support, a cover secured to the support and including an opening, a disc disposed opposite the opening in the cover secured to the support, and a plurality of successive chicanes provided between the support and the shaft, the plurality of successive chicanes formed about the longitudinal axis by grooves in the cover that cooperate with grooves in the disc; each chicane configured to oppose a penetration of liquid through the opening and to allow for transporting liquid that has penetrated into the chicane:
      along a first path, under the effect of gravity, towards an evacuation circuit associated with the chicane and formed in the support, and
      along a second path, and counter to the effect of gravity, towards a successive chicane or towards the shaft;
   the evacuation circuit of each of the chicanes allows for evacuating liquid out of the support under the effect of gravity moving away from the shaft.

2. The probe according to claim 1, wherein the support comprises a capturing chamber, associated with a chicane, towards which liquid that has penetrated into the chicane is driven under the effect of gravity; the evacuation circuit associated with the chicane communicating with at least one low point of the capturing chamber.

3. The probe according to claim 2, wherein the capturing chamber associated with a chicane consists of a circular groove open towards the chicane and communicates with the evacuation circuit associated with the chicane at a low point of the capturing chamber.

4. The probe according to claim 2, wherein the capturing chamber associated with a chicane consists of a groove open towards the chicane along a portion of an arc of a circle; each end of the portion of an arc of a circle forming a low point of the capturing chamber and communicating with the evacuation circuit associated with the chicane.

5. The probe according to claim 1, wherein the evacuation circuit associated with a chicane comprises at least one expansion cavity that is connected to the chicane by an evacuation duct and comprises one or more outlet orifices that are able to transport, under the effect of gravity, liquid that has accumulated in the expansion cavity towards an expansion cavity associated with a preceding chicane or out of the support.

6. The probe according to claim 1, comprising at least two successive chicanes:
   a first chicane with which a circular capturing chamber open towards the first chicane, and an evacuation circuit comprising an expansion cavity connected to the circular capturing chamber by a radial evacuation duct are associated,
   and at least one second successive chicane with which a capturing chamber open towards the second chicane along a portion of an arc of a circle, and an evacuation circuit comprising two expansion cavities each connected to one end of the portion of an arc of the circle by a radial evacuation duct are associated;
   the expansion cavity associated with the first chicane comprising a plurality of outlet orifices that are able to transport accumulated liquid out of the support; the expansion cavities associated with the at least one second chicane each comprising an outlet orifice that is able to transport accumulated liquid towards the expansion cavity associated with the first chicane.

7. The probe according to claim 6, comprising three successive chicanes: one first chicane and two second chicanes.

8. The probe according to claim 6, wherein the expansion cavity and the outlet orifices associated with the first chicane are configured such that the liquid that has penetrated through a first outlet orifice is evacuated preferably through a second outlet orifice, limiting returns of liquid towards the chicane.

9. The probe according to claim 1, wherein for at least one chicane, the smallest dimension of the minimum flow cross section of the first path is larger than the smallest dimension of the minimum flow cross section of the second path.

10. The probe according to claim 9, wherein the smallest dimension of the minimum flow cross section of the first path is large enough to allow the transport of water droplets.

11. The probe according to claim 9, wherein the smallest dimension of the minimum flow cross section of the first path is larger than 3 mm.

12. The probe according to claim 9, wherein the smallest dimension of the minimum flow cross section of the second path is small enough to prevent the transport of water droplets and to limit the passage of pressurized liquid.

13. The probe according to claim 9, wherein the smallest dimension of the minimum flow cross section of the second path is smaller than 3 mm.

14. The probe according to claim 1, comprising simultaneous additive manufacturing of the support and of the shaft that together form the successive chicanes.

* * * * *